United States Patent [19]

Weichel

[11] 4,359,100

[45] Nov. 16, 1982

[54] ATTACHMENT COMBINATION FOR AGRICULTURAL TRACTORS

[76] Inventor: Ernst Weichel, Postfach 1180, Bahnhofstrasse 1, D-7326 Heiningen, Fed. Rep. of Germany

[21] Appl. No.: 197,067

[22] Filed: Oct. 15, 1980

[30] Foreign Application Priority Data

Oct. 29, 1979 [DE] Fed. Rep. of Germany ....... 2943005

[51] Int. Cl.³ ............................................. A01B 33/02
[52] U.S. Cl. ..................................... 172/30; 172/112; 172/47; 111/1
[58] Field of Search ...................... 172/47, 30, 28, 29, 172/272, 112, 483, 504; 111/1; 280/461 A, 460 R

[56] References Cited

U.S. PATENT DOCUMENTS

| | | | |
|---|---|---|---|
| 2,163,805 | 6/1939 | Pendell | 172/483 |
| 2,312,164 | 2/1943 | Holzbock | 172/112 |
| 2,974,472 | 3/1961 | Gebhart | 56/504 |
| 3,880,099 | 4/1975 | Houston | 111/1 |
| 3,913,502 | 10/1975 | Richey | 111/1 |
| 3,931,858 | 1/1976 | North | 172/63 |
| 3,977,476 | 8/1976 | Lely | 172/47 |
| 4,056,250 | 11/1977 | Uchiyama | 172/272 |

FOREIGN PATENT DOCUMENTS 2506223 8/1976 Fed. Rep. of Germany ........ 172/28

Primary Examiner—Richard J. Johnson
Attorney, Agent, or Firm—Toren, McGeady & Stanger

[57] ABSTRACT

In an attachment combination for agricultural tractors used for loosening soil in a field covered with living or dead plants or crop residue, a covering hood forms an ejection channel with a motor driven flail mower positioned under the hood. A support tube is located behind the mower and it carries at least one row of loosening elements. Motor driven rotatable tools are located rearwardly of the loosening elements. The flail mower hood can discharge in a first position where the material is directed downwardly and rearwardly in front of the support tube or in a second position where the material is directed behind the loosening elements and the rotatable tools. The mower is mounted on a rearwardly open U-shaped support frame consisting of a cross beam and two laterally spaced longitudinal beams extending perpendicularly of the cross beam. A coupling piece is located on the free end of each longitudinal beam with a counterpiece clamped on the support tube. The coupling pieces can be easily detached from the counterpieces.

6 Claims, 5 Drawing Figures

ATTACHMENT COMBINATION FOR AGRICULTURAL TRACTORS

The invention relates to an attachment combination for agricultural tractors for loosening in a field preferably covered with living or dead plant or crop residues, having a motor-driven flail mower disposed under a covering hood, at least one row of loosening elements disposed therebehind, and motor-driven tools rotating behind them for crumbling the loosened soil, wherein the flail mower hood either ends before the front side of the support tube of the loosening elements in a direction slanting backward and downward or extends beyond the loosening elements and the rotating tools for the crumbling of the soil disposed behind them, according to German Patent Application No. 2,755,676. This known implement has the disadvantage that the loosening elements are fastened to a cross beam arranged behind the flail knives of the flail mower and therefore can only be used together with the flail knives of the flail mower, not separately by themselves or in combination with an implement disposed behind the loosening members for the crumbling of the soil and/or with a drill.

In practice, however, this mode of working is very important for the reason that loosening of the soil must be effected predominantly on fields which are not covered with living or dead plants.

Another disadvantage of the known combination consists in that the arrangement of a part—displaceable concentrically to the circular path of the flail knives of the ejection channel wall is, for reasons of space, realizable in the practice only at exorbitant cost, and moreover the displacement of such a wall portion is difficult in the practice for the reason that in actual operation the guide strips required for that purpose become fouled up too much.

The invention solves the problem of eliminating these and other disadvantages inherent in the known combination by arranging the flail mower on a support frame open rearwardly, which consists of at least one cross beam extending crosswise to the direction of travel and of at least two longitudinal beams extending in the direction of travel, whose free ends each carry a coupling piece connected for easy detachment with a counterpiece clamped on the support tube of the loosening members.

Further particularities of the solution of this problem are evident from the characterizing parts of the subclaims and from the following figure description.

Figure 1:
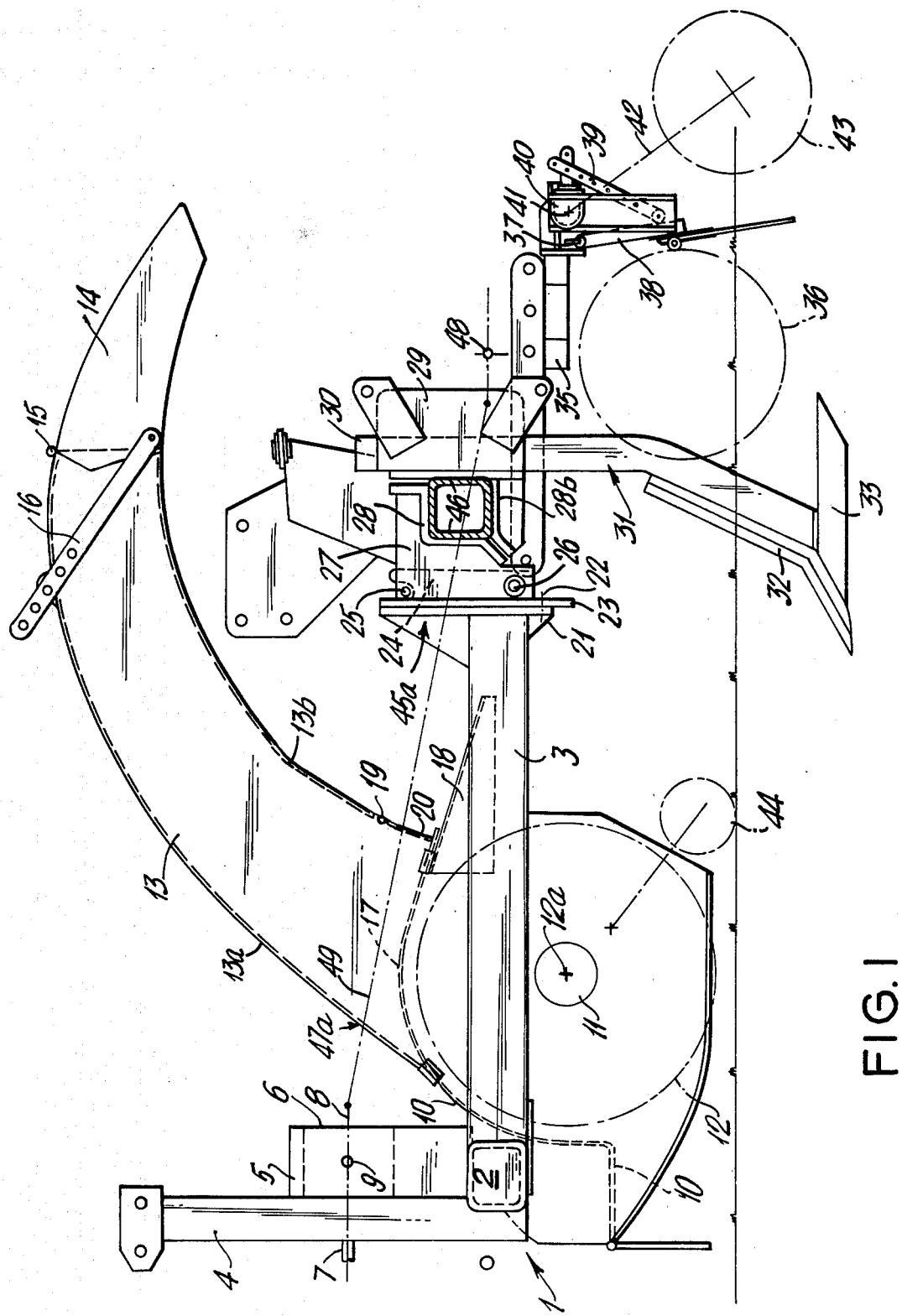
FIG. 1 is a schematic side view of a device embodying the present invention.

As FIG. 1 shows, the implement combination consists of a support frame 1, which comprises a cross beam 2, at the outer ends of which longitudinal beams 3 are disposed which extend in a rearward direction. In the center of the cross beam 2, a mounting trestle 4 is disposed, which is additionally connected with the cross beam 2 by stands 5 between which a gear train 6 is disposed, comprising a front input shaft 7, a rear output shaft 8, and a lateral output shaft 9. The latter drives, in a manner known in itself and not shown in detail, via an intermediate bearing and a V-belt back-gearing arrangement, the flail shaft 12a of the flail mower 12 mounted in the bearing 11.

The rear output shaft 8 is connected with the input shaft 48 of a known gear train of a known rototiller through a schematically shown drive shaft 49. This drive shaft 49 passes through two openings 47a and 47b disposed in the walls 13a and 13b of the ejection channel 13 which prolongs the housing 10 upwardly. At the upper end of the ejection channel 13 a pivot flap 14 pivoting about a hinge 15 is arranged; it can be fixed in different ejection directions by an adjusting strut 16. Thereby the direction of ejection of the organic material picked up by the flail mower, shredded, and thrown over and beyond the implements for loosening and crumbling the soil can be varied so that the material falls to the ground selectively far behind or directly behind the rototiller and therefore can be deposited either mixed with small amounts of soil or entirely without soil admixture.

If the organic material is not to be applied essentially as ground cover on the loosened and crumbled soil, but is to be predominantly mixed into the loosened soil, an insert sheet or plate 17 can be inserted through an opening in the wall 13b made accessible after a flap 20 pivotable about a hinge 19 has been opened and can be secured in mounts (not shown in all details), so that the ejected material is deflected by the insert sheet 17 and is guided into a blow-out hood 18 attached to the longitudinal beams 3. Thereby it can be blown through between the holding posts 30 of the loosening members 31 directly into the sphere of action of the times of the rototiller 36, thereby achieving an especially good and uniform distribution and mixing in of the organic material in the loosened soil.

To permit separate use of the flail mower 12 as well as of the loosening implement and rototiller in a very simple manner, the free ends of the longitudinal beams 3 are provided with a coupling flange 21, which is connected rigidly but detachably by only schematically indicated screws 22 with a counter-plate 23 on which ribs 24 are provided which receive studs 25 and/or plugs 26 disposed on longitudinal plates 27. As the longitudinal plates 27 are connected with pipe shackles 28a, 28b which can be clamped on the support tube 46 of the loosening members 31, a simple solution of the rigid connection of the entire implement combination is obtained. On part 28b of the pipe shackle is located also the holding pocket 29 of the holding post 30 of the outer loosening members 31, which are provided with chisels 32 and loosening plowshares 33 in a manner known in itself. Links 34 which are firmly connected with the frame 35 of the rototiller 36, and which permit hinging the implement to the support tube 46 adjustable in height, are hinged in a manner known in itself to devices not shown in detail for holding the support tube 46.

The rototiller 36 takes support on a crumbling roll 43, which is secured to the frame of the rototiller 36, adjustable in height, in a manner known in itself through a bearing arm 42 with a holding tube 41 in bearing boxes 40.

A moldboard 38 disposed between the tine paths of the rototiller 36 and the crumbling roll 43 is pivotally secured about a hinge 37 on the frame 35 and is adjustable in different angular positions relative to the vertical by an adjusting strut 39.

In operating position, the flail mower 12 is guided over the ground at an adjustable height by a supporting roll 44.

Figure 2:
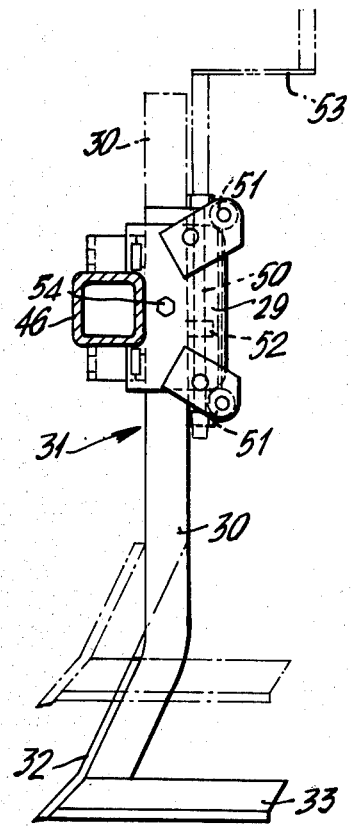
FIG. 2 is a schematic side view of a portion of the device illustrated in FIG. 1.
Figure 3:
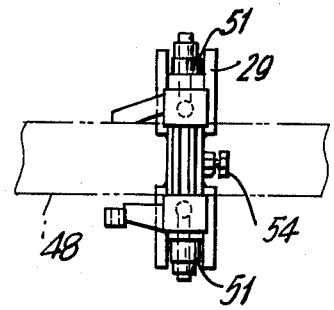
FIG. 3 is a schematic side view of the portion of the device shown in FIG. 2, taken at right angles to the plane of FIG. 2.
Figure 4:
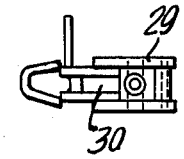
FIG. 4 is a top view of the portion of the device shown in FIGS. 2 and 3.
Figure 5:
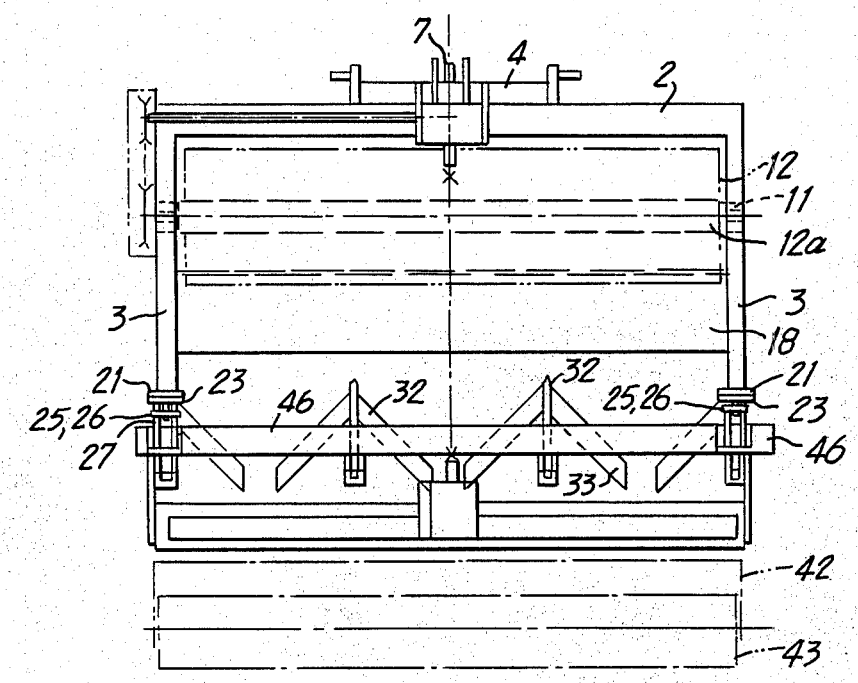

The working depth of the loosening shares 33 of the loosening members 31 is adjustable according to the invention in that, as shown in FIGS. 2 to 4, the holding post 30 is mounted displaceable in the holding pocket 29 and is adjusted to different height positions by a threaded spindle 50 which is rotatably mounted in bearing bushings 51 and guided in a threaded block 52 disposed in the holding post 30. The actuation of the threaded spindle occurs by a removable crank 53. The posts 30 can be fixed by a setscrew 54 after completed adjustment. Spindle 52 has relatively plenty of play in the bearing bushings 51 so as to avoid stress on the spindle from lateral forces occurring in operating position.

I claim:

1. Attachment combination for agricultural tractors for loosening soil in a field preferably covered with living or dead plant or crop residues, comprising a covering hood forming an ejection channel, a motor-driven flail mower disposed under said covering hood, at least one row of loosening elements disposed behind said flail mower, a support tube for said loosening elements, and motor-driven tools rotating behind said loosening elements for crumbling the loosened soil, wherein said flail mower hood is arranged to discharge in one of a first position and a second position so that in the first position said hood discharges before the front side of the support tube of the loosening elements in a direction slanting backward and downward and in the second position discharges beyond the loosening elements and the rotating tools for the crumbling of the soil disposed behind them, characterized in that said flail mower is mounted on a rearwardly open U-shaped support frame (1) which consists of at least one cross beam (2) extending crosswise to the direction of travel and of at least two laterally spaced longitudinal beams (3) extending in the direction of travel from said cross beam and each having a free end, a coupling piece on each said free end of said beams (45a), a counter-piece (45b) clamped on the support tube (46) of the loosening members and said coupling piece connected for easy detachment with said counter-piece.

2. Attachment combination according to claim 1, wherein said ejection channel (13) consists of at least two parts, characterized in that said ejection channel has an opening (47b) at the upstream end thereof, a flap (20) arranged to close the opening, an insert sheet (17) is selectively insertable into the opening after said flap is removed from the closing position so that said insert sheet closes the upstream opening of said ejection channel (13), a blow-out hood located rearwardly of said insert sheet inserted into said opening and said hood arranged to eject the material from said flail mower (12) in a direction slanting rearwardly and downwardly.

3. Device according to claim 2, characterized in that said ejection channel (13) has a front wall (13a) containing a passage opening (47a), a rear wall (13b) containing said opening (47b), and a drive shaft connecting gear (6) with gear (48) of the rototiller extends through said passage opening and said opening in said rear wall.

4. Device according to one of claims 1, 2 or 3, characterized by a holding pocket, holding post (30) displaceably mounted in said holding pocket (29) adjusts said holding post to different height positions, a threaded block on said holding post, and said threaded spindle (50) is rotatably mounted in bearing bushings (51) and is guided in said threaded block (52).

5. Device according to claim 1, characterized in by a coupling flange (21), a counter-plate having ribs thereon, screws (22), rigidly but detachably connect said coupling flange with said counter-plate (23), at least one of studs (25) and plugs (26) arranged to be received in said ribs, longitudinal plates (27) mounting said at least one of studs and plugs, pipe shackles (28a, 28b) arranged to be be clamped on said supporting tube 46 of said loosening elements (31) and said longitudinal plates are mounted on pipe shackles.

6. Device according to claim 4, characterized in that at least one said holding pocket (29) of said holding post (30) of said loosening elements (31) is disposed on part (28b) of said pipe shackle.

* * * * *